Figure 1:
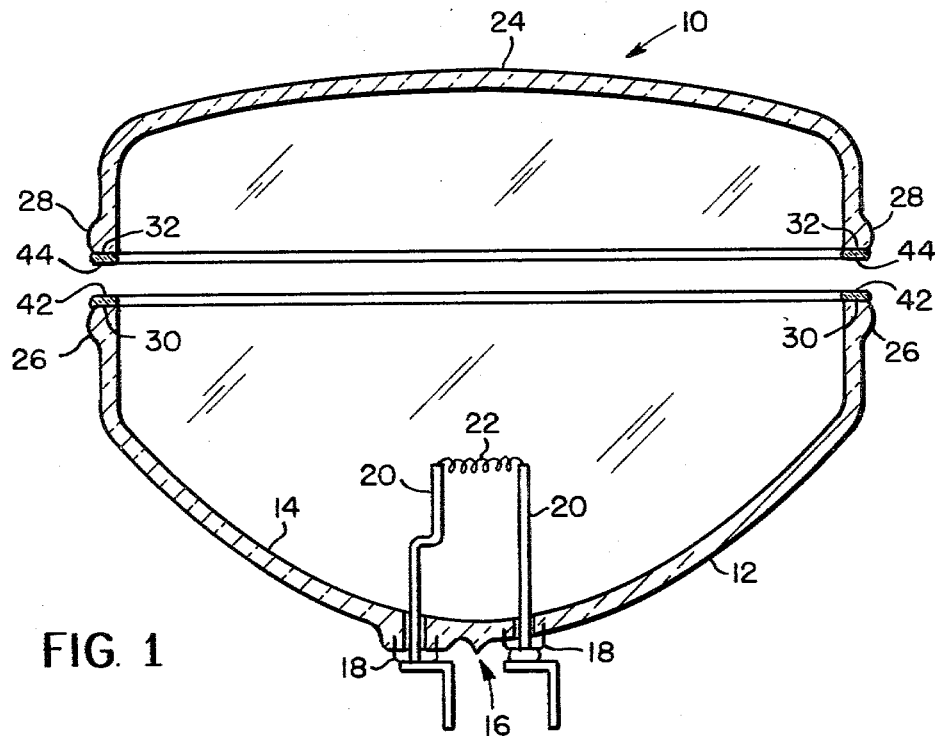

United States Patent [19]

Bonk et al.

[11] 4,238,704
[45] Dec. 9, 1980

[54] SEALED BEAM LAMP OF BOROSILICATE GLASS WITH A SEALING GLASS OF ZINC SILICOBORATE AND A MILL ADDITION OF CORDIERITE

[75] Inventors: John A. Bonk, Big Flats; Joseph W. Malmendier, Corning, both of N.Y.

[73] Assignee: Corning Glass Works, Corning, N.Y.

[21] Appl. No.: 11,513

[22] Filed: Feb. 12, 1979

[51] Int. Cl.$^3$ .................... C03C 3/08; H01J 5/24
[52] U.S. Cl. .................... 313/113; 106/53 A; 106/53 C; 65/33; 65/155; 220/2.1 A
[58] Field of Search ............................ 313/113

[56] References Cited

U.S. PATENT DOCUMENTS

| | | | |
|---|---|---|---|
| 2,517,019 | 8/1950 | Nordberg | 65/47 X |
| 2,643,020 | 6/1953 | Dalton | 106/53 A X |
| 2,889,952 | 6/1959 | Claypoole | 65/33 X |
| 3,010,045 | 11/1961 | Plagge et al. | 313/113 |
| 3,113,878 | 12/1963 | Martin | 106/53 C X |
| 3,217,088 | 11/1965 | Steierman | 174/52 S |
| 3,250,631 | 5/1966 | Lusher | 106/52 X |
| 3,258,350 | 6/1966 | Martin et al. | 65/33 |
| 3,442,993 | 5/1969 | Yamamoto et al. | 65/155 |
| 3,632,324 | 1/1972 | Sasaki et al. | 65/43 |
| 3,660,064 | 5/1972 | Rohde | 65/40 X |
| 4,125,890 | 11/1978 | Nixon | 362/348 |

*Primary Examiner*—Robert Segal
*Attorney, Agent, or Firm*—Clinton S. Janes, Jr.; Milton M. Peterson

[57] ABSTRACT

A composite article is disclosed which embodies a thermally sensitive component enclosed within borosilicate glass bodies having a coefficient of thermal expansion in the range of 30 to $40 \times 10^{-7}/°$ C. The bodies are joined by an intermediate layer of sealing material which is a fused mixture of a sealing glass containing an infra-red absorbing oxide and a mill additive having a low coefficient of thermal expansion. There is further disclosed a method of forming the seal between the glass bodies by application of infra-red radiation to the sealing material.

2 Claims, 2 Drawing Figures

SEALED BEAM LAMP OF BOROSILICATE GLASS WITH A SEALING GLASS OF ZINC SILICOBORATE AND A MILL ADDITION OF CORDIERITE

BACKGROUND OF THE INVENTION

This invention relates to joining glass bodies along their sealing surfaces with an intermediate layer of sealing material to produce a composite article. It is particularly concerned with the production of a composite article which embodies a thermally sensitive element such as a metal conductor, a phosphor coating, or a reflecting film of a metal such as aluminum. While obviously broader in scope, the invention specifically provides a novel electric lamp construction of the type commonly known as a sealed beam lamp and widely used in vehicle headlamps.

Such lamps tend to operate at elevated temperatures. This factor, taken with the severe climatic conditions to which the lamp may be exposed in operation, requires a glass strongly resistant to thermal shock. Accordingly, it is customary to mold the reflector and lens components from a borosilicate glass having a thermal coefficient of expansion ($0°$-$300°$ C.) in the range of 30 to $40 \times 10^{-7}/°C$.

In current commercial assembly practice, the filament is precisely positioned within, and sealed into, the reflector member. That member is then aligned in opposed relationship to the lens member, the peripheral edges softened by flame heating, and the edges brought together and worked to form a direct fusion seal. It is generally necessary to bring the glass sealing edges to a temperature on the order of $1300°$ C. to effect a reliable seal.

At the elevated temperatures required for flame sealing, there is a tendency for the glass envelope, and especially the reflector portion thereof, to warp. This requires an application of air pressure to restore the requisite contour to the sealed lamp. Meanwhile, the aluminum reflector film frequently becomes oxidized, thus reducing its efficiency. Finally, considerable care is necessary to minimize damage to the lamp filament during a flame sealing operation. It will of course be apparent that similar, and often more aggravated, problems arise in other sealing operations where thermally sensitive elements are involved, such as encasing electronic components in glass envelopes.

A factor of recent origin is the potential unavailability of gas as a fuel, at least during certain critical periods of high consumption. Thus, there is an obvious need for a reliable substitute sealing procedure, at least on a standby basis. Further, such substitute procedure should provide an overall diminished energy impact.

The principle of using a soft sealing glass as a replacement for a direct flame seal has been recognized for at least the past 30 years, as evidenced by U.S. Pat. No. 2,643,020, granted June 23, 1953 to R. H. Dalton. The stable glass seal of Dalton was followed by a thermally devitrified type glass seal as described generally in U.S. Pat. No. 2,889,952, granted June 9, 1959 to S. A. Claypoole. That type of seal has been widely used in cathode ray tube production for color television reception. However, the long temperature cycles of cathode ray tube production, which may be on the order of an hour, are detrimental to elements in sealed beam lamps even at the relatively moderate temperatures involved.

Further, cathode ray tube glasses normally have expansion coefficients on the order of 90 to $100 \times 10^{-7}/°C$. Thus, while very satisfactory sealing glasses are available for use with glasses in this expansion range, the situation is quite different where, as in sealed beam lamps, parts with expansions in the 30 to $40 \times 10^{-7}/°C$. range are involved.

PURPOSE OF THE INVENTION

A basic purpose is to provide an improved seal between glass parts in a composite article. More specifically, a seal is provided that is compatible with parts molded from borosilicate glasses having coefficients of thermal expansion in the range of 30 to $40 \times 10^{-7}/°C$.

A further purpose is to obviate the need for flame sealing such glass parts, and thereby reduce the risk of glass distortion and damage to thermally sensitive elements in the article.

Another purpose is to provide an improved glass sealing technique that employs focused infra-red radiation. A related purpose is to shorten the sealing time required as well as lessen the energy requirement.

A specific purpose is to provide an improved sealed beam lamp and a method of producing such improved lamp.

SUMMARY OF THE INVENTION

The composite article of the present invention embodies a thermally sensitive component enclosed within two glass bodies joined along opposed sealing surfaces by an intermediate layer of sealing material, each glass body being molded from a borosilicate glass having a coefficient of thermal expansion in the range of 30 to $40 \times 10^{-7}/°C$., and the layer of sealing material being a fused mixture having an effective coefficient of thermal expansion not greater than that of the borosilicate glass. The fused mixture is composed of a sealing glass and a mill addition, the sealing glass having a softening point below $700°$ C., a coefficient of thermal expansion greater than that of the borosilicate glass parts, and containing, in its composition, an infra-red absorbing oxide selected from copper oxide, iron oxide, and mixtures of such oxides, and the mill addition, as compared to the sealing glass, having a substantially higher softening point and lower coefficient of thermal expansion. In a specific embodiment, the glass bodies are the reflector and the lens member of a sealed beam lamp.

The invention further contemplates a method of producing such composite article including the steps of applying a strip-like layer of sealing material to the sealing surface of at least one of the glass bodies, and preferably both, assembling the glass bodies in contacting relation through the sealing material, and then focusing infra-red radiation sources through the walls of the parts onto opposite sides of the sealing material to soften the sealing glass and form a hermetic seal between the glass bodies.

PRIOR ART

In addition to the patents noted earlier, mention is now made of literature showing certain elements of the invention as used in a different manner and/or for different purposes.

Focused infrared radiation has been proposed for a variety of sealing operations. Thus, U.S. Pat. No. 3,660,064, granted May 2, 1972 to T. L. Rohde, shows forming a glass-metal seal in a reed switch; U.S. Pat. No. 3,632,324, granted Jan. 4, 1972 to K. Sasaki et al., shows sealing lead wires into a glass envelope with radiation focused on a sealing glass; and U.S. Pat. No. 3,217,088, granted Nov. 9, 1965 to B. L. Steierman, shows sealing a cover glass to a glazed metal base with a soft glass ring.

Zinc silicoborate sealing glasses of intermediate expansion range are disclosed in U.S. Pat. No. 3,113,878, granted Dec. 10, 1963 to F. W. Martin. The effectiveness of ferrous and/or copper oxides as infrared absorbers in soft glasses is shown, for example, in the publication "Infrared Absorbing Sealing Glasses" by Hoogendoorn and Sunners at pp. 1125-1127 of Vol. 48, No. 12 (1969) of the Ceramic Bulletin published by the American Ceramic Society.

The use of inert refractory metal oxides as a means of lowering thermal expansion coefficient is disclosed in U.S. Pat. No. 3,250,631, granted May 10, 1966 to K. G. Lusher; in U.S. Pat. No. 3,258,350, granted June 28, 1966 to F. W. Martin et al.; and in U.S. Pat. No. 3,442,993, granted May 6, 1969 to H. Yamamoto et al. U.S. Pat. No. 2,517,019, granted Aug. 1, 1950 to M. E. Nordberg, shows a graded seal produced from a high expansion glass, a low expansion glass, and a ceramic refractory.

GENERAL DESCRIPTION OF THE INVENTION

The glass bodies, which are sealed together to form a composite glass enclosure in accordance with the invention, are molded from a low expansion (30 to $40 \times 10^{-7}/°C$.) borosilicate type glass. In known manner, they are molded with flat peripheral sealing surfaces adapted to have a layer of sealing material applied thereto. It will, of course, be appreciated that such glasses, and bodies molded therefrom, are well known and widely used commercial products. Hence, no further description is deemed necessary.

As explained earlier, such glasses can be, and are, readily flame sealed. However, this requires heating to a temperature on the order of 1300° C. where there is a strong tendency for glass distortion to occur. Also, there is a serious danger of damage to any thermally sensitive element that is part of the assembly being sealed. As mentioned earlier, such sensitive elements may be semiconductor materials, metal conductors, lamp filaments, aluminum reflecting films, phosphor screens, and the like. The specific sealing material and particular method of sealing, upon which the present invention is founded, are designed to alleviate these and other problems arising in connection with flame sealing.

The present sealing material is a mixture having an effective coefficient of thermal expansion not greater than that of the borosilicate glasses being sealed, and preferably a few units lower. It is composed essentially of a known sealing glass of moderate expansion coefficient modified by a composition additive as well as a mill addition.

The base sealing glass must have a softening point below 700° C. in order to provide proper seal development at a sealing temperature on the order of 600° C. In accordance with the present invention, it is contemplated that this glass will have a moderate coefficient of thermal expansion somewhat greater than that of the borosilicate glass components being sealed, but not substantially greater. Accordingly, a sealing glass with a coefficient in the range of $40$ to $60 \times 10^{-7}/°C$. is prescribed.

We have found that the zinc silicoborate glasses disclosed in U.S. Pat. No. 3,113,878 (F. W. Martin) provide an excellent basis or starting point for the sealing materials used in the present invention. These glasses are composed essentially of 60-70% ZnO, 10-16% $SiO_2$, and 19-25% $B_2O_3$, the percentages being on a calculated weight basis. These glasses have the requisite low softening point and also have moderate thermal expansion coefficients in the range of 40 to $60 \times 10^{-7}/°C$. Such coefficients are not satisfactory for direct soft glass sealing, but are satisfactory for present purposes as subsequently explained. Since the patent fully describes the glasses and provides numerous examples thereof, it is incorporated herein by reference for such teachings.

For present purposes, a sealing glass must additionally contain in its composition an oxide that absorbs infra-red radiation, whereby such radiation may be used as a source of heat to soften the sealing glass and thereby carry out the sealing operation, at least in part. As pointed out earlier, the oxides of copper and iron are recognized as major infra-red radiation absorbers, that is, oxides that are not only highly absorbing but also readily available.

It is a feature of the present invention that the zinc silicoborate glasses disclosed in the Martin patent may be modified by incorporating several percent of copper or iron oxide in their composition without substantially changing the nature of the glass, and particularly the thermal expansion coefficients thereof. For our purposes then, we prefer to use the zinc borosilicate glasses of the patent, and to modify their compositions by including several percent of copper or iron oxide as an infra-red absorbing oxide. These oxides may be added in amounts ranging from 1 to 20% of the glass composition with copper oxide appearing to be the more effective absorbing oxide. Normally, an amount in the range of 3 to 7% provides an optimum degree of absorption without unduly altering the nature of the parent glass.

A particular feature of the invention is a sealing material having an effectively lower coefficient of thermal expansion value than that of the sealing glass component, and also a value no greater than, and preferably a few units below, that of the borosilicate glass components being sealed. We achieve this by incorporating a mill addition of a relatively low expansion glass or ceramic that remains relatively inert, or unaffected, by the sealing glass at sealing temperature. The mill addition may be a glass having a relatively high melting point with respect to the base sealing glass, for example, a $MgO-Al_2O_3-SiO_2$ glass having a composition approximating that of the mineral cordierite. Also, there are a number of low expansion ceramic and glass-ceramic materials that soften at relatively high temperatures, and hence are relatively inert at lower sealing temperatures as used in the present invention.

The sealing glass, containing an infra-red absorbing oxide in its composition, and the mill addition, as just described, are intimately mixed, preferably by ball milling the mixture to a fine powder passing through a 200 mesh (74 microns) screen. The pulverized sealing mixture, or frit, may be mixed with an organic vehicle in conventional manner to form a thick, extrudable mixture that may be deposited as a layer or ribbon on the flat peripheral sealing edge or rim of a component glass body. Application of the sealing material to the sealing edge of one component may be adequate, but we generally prefer to apply a sealing layer to each sealing surface. The applied layer, or layers, are air dried and then heated to a moderate temperature to burn out the organic vehicle and prepare the assembly for final sealing. This may be in conjunction with the preheat described below.

A particular feature of the present inventive method is the use of focused infrared heating to soften the sealing glass mixture. While this source of heat may be used for the entire sealing operation, it is generally time consuming and inefficient, except for the final stage of the operation. Accordingly, we prefer to heat the assembly of glass parts, separated by the layer or layers of sealing mixture, to a temperature of 400°–500° C. by normal oven or other heating procedure. The maximum preheat temperature will depend on what thermally sensitive elements are present in the assembly and the degree and/or amount of heat that they can safely be exposed to. The preheated assembly is then moved into position for exposure to one or more sources of focused infra-red radiation.

In accordance with the present method, focused infra-red radiation is directed through the glass component walls onto the deposited frit sealing material with the focal point or line being at the frit-glass interface. It is a particular feature of the present method that focused radiation is directed from two separate sources set at an angle on the order of 60°–90° with respect to each other so that radiation is focused at both the upper and lower surfaces of the sealing glass layer, that is the glass-frit interfaces. This provides equal heating of the sealing material from opposite sides and is believed to be necessary for proper seal formation.

The infra-red radiation is absorbed in the sealing glass or frit layer by the iron or copper oxide component of the sealing glass. This causes the sealing glass portion of the mixture to soften and the mixture to flow into a sealing layer of desired geometry, while avoiding undue heating of other parts of the assembly, in particular any thermally sensitive element such as a filament or reflecting film.

The low expansion, high melting point, additive glass or ceramic should normally not exceed about 20% of the sealing mixture on a weight percent basis. Larger amounts tend to unduly interfere with flow of the sealing mixture. This, in turn, causes recesses or other irregularities in the sealing material which tend to promote cracks and resultant leakage on cooling. The additive must, however, be sufficient in amount, when admixed with the sealing glass, to produce an effective thermal expansion coefficient that is equal to, or preferably slightly below, that of the borosilicate glass parts being sealed together. This permits developing either a stress-free seal, or one under a slight compression, after annealing of the assembly. The sealed article is annealed in accordance with normal glass annealing practice.

THE DRAWING

Figure 2:
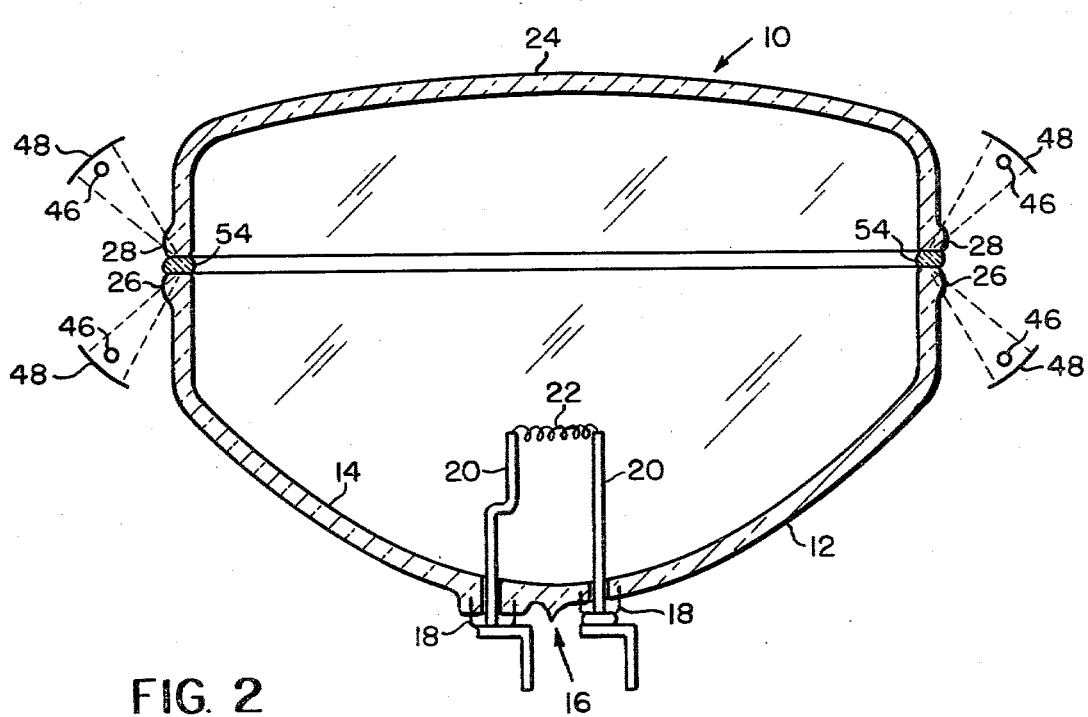
Figure 3:
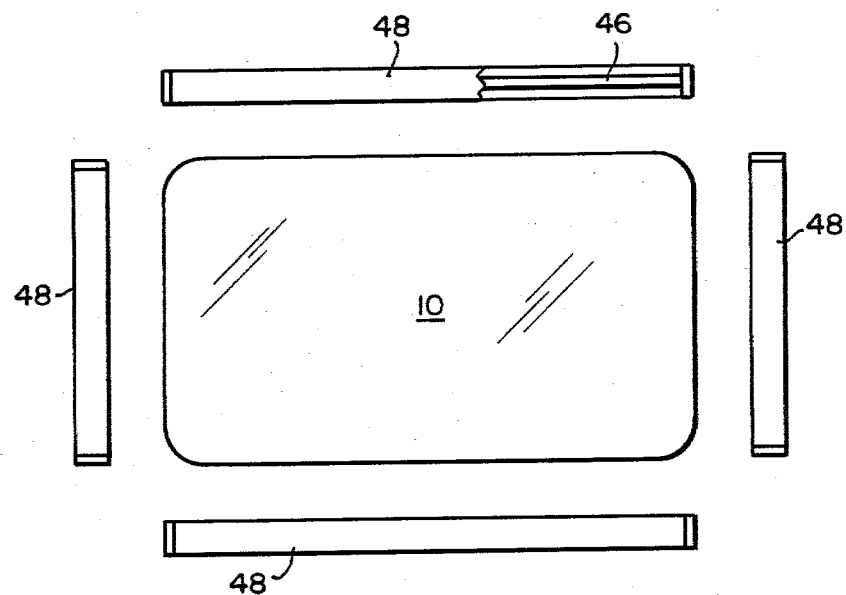
Figure 4:
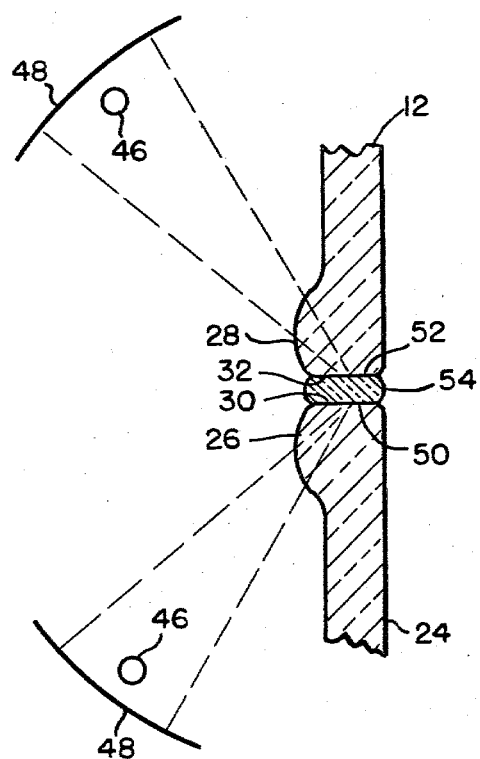
Figure 5:
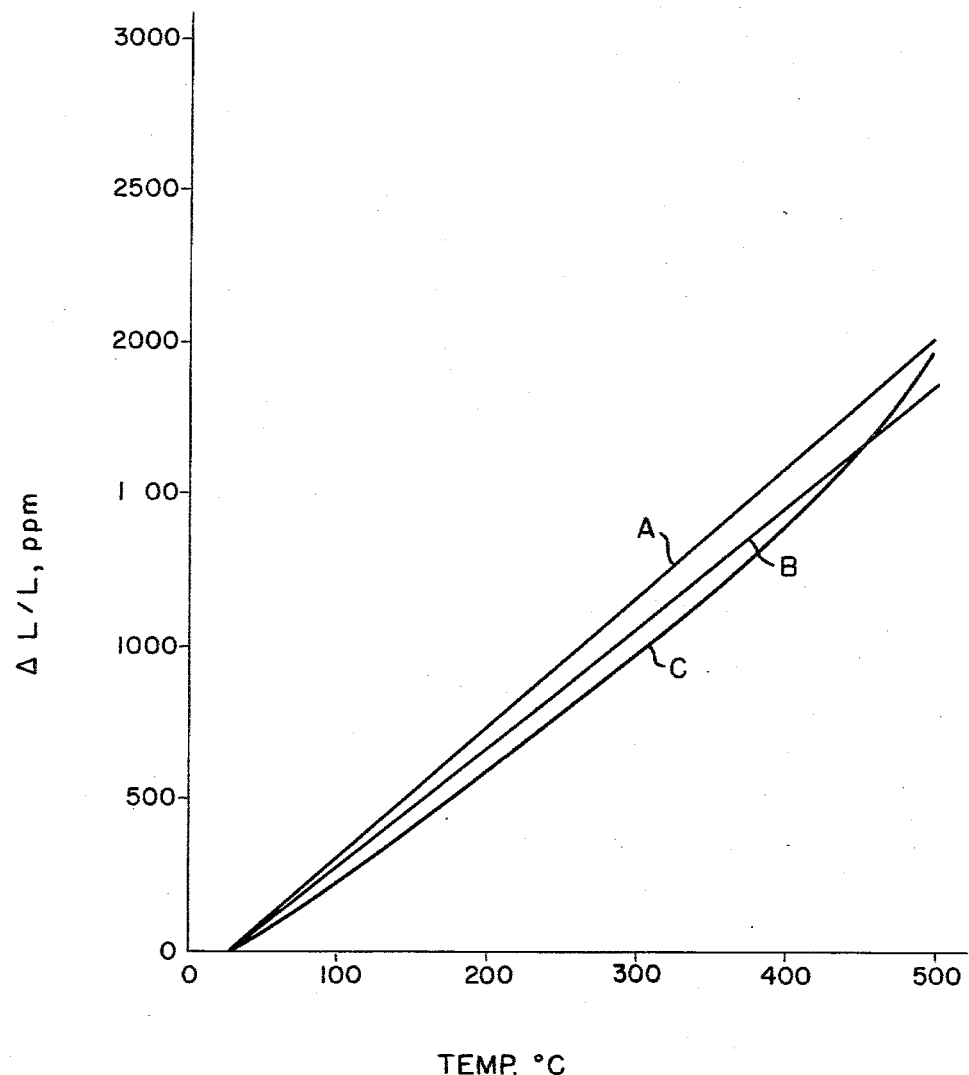

The invention is further described and illustrated with reference to a specific embodiment, namely a sealed beam, rectangular, auto headlamp. In the accompanying drawing, FIG. 1 is an exploded cross-sectional view of the component parts in a sealed beam headlamp assembly prior to their being joined to form a composite article in accordance with the invention, FIG. 2 is a view, also in cross-section, showing the headlamp formed from the parts of FIG. 1, and illustrating the infra-red sealing method of the invention, FIG. 3 is a top plan view of one arrangement of infra-red lamps for producing the article of FIG. 1, FIG. 4 is a fragment view schematically illustrating application of infra-red radiation in accordance with the inventive method, and FIG. 5 is a graphical illustration of changes effected in thermal expansion coefficients in accordance with the invention.

SPECIFIC DESCRIPTION

FIG. 1 shows, in cross-section, an exploded view of a typical lamp assembly 10 for producing a rectangular auto headlamp in accordance with the present invention. Lamp assembly 10 comprises clear glass reflector member 12 and lens member 24. Reflector member 12 has an aluminized reflecting film 14 applied to its inner surface in usual manner. Lens member 24 is shown as a typical flat lens for a rectangular lamp. However, it will be appreciated that the present invention is unrelated to the specific geometry or optics of lens member 24.

Reflector 12 and lens 24 are typical commercial glass parts molded from Code No. 7251 glass, a borosilicate glass produced for this purpose by Corning Glass Works. The glass is composed essentially of, in weight percent as calculated from the glass batch on an oxide basis, 77.4% $SiO_2$, 15.4% $B_2O_3$, 1.9% $Al_2O_3$ and 5.3% $Na_2O$, is chloride fined, and has a thermal coefficient of expansion (25°–300° C.) of approximately $38 \times 10^{-7}$/°C.

Reflector 12 has a conventional base 16 for electrical connections. Base 16 is shown here as composed of caps 18 to which terminal posts 20 are sealed. Posts 20, in turn, carry filament 22. Various techniques, including infra-red sealing, are available for sealing terminals in a lamp, as are methods for evacuating the lamp and properly positioning the filament. Since these matters are not part of the present invention, no further description is made. Specific reference may be made to U.S. Pat. No. 4,125,890 granted Nov. 14, 1978 to Roy A. Nixon, Jr., although the present invention is not related to this particular type of lamp base construction.

Reflector 12 and lens 24 are provided with slightly enlarged flat lips 26 and 28, respectively. As shown in FIG. 1 and enlarged FIG. 4, lips 26 and 28 have opposed flat sealing surfaces 30 and 32.

In a separate preliminary operation, layers 42 and 44 of a sealing mixture were extruded onto sealing surfaces 30 and 32 with the shape and amount of the mixture being such as allow the mixture to flow into a well rounded seal. While this particular sealing surface geometry is not critical, it is preferred since it tends to minimize reentrant angles and provide a rounded seal edge 54 as illustrated in FIGS. 2 and 4.

A low melting sealing glass A, of the type disclosed in U.S. Pat. No. 3,113,878 and additionally containing copper oxide (CuO) in its composition, was melted in a platinum crucible by heating a suitably mixed batch to 1350° C. and holding for 3 hours. The melt was drigaged, that is, poured into water to cause granulation. The glass composition consisted essentially of, in weight percent calculated from the batch on an oxide basis, 61.2% $ZnO$, 21.3% $B_2O_3$, 11.8% $SiO_2$, and 5.7% $CuO$. It had a thermal coefficient of expansion (0°–300° C.) of $41.2 \times 10^{-7}$/°C. and a softening point below 700° C.

Two further glasses, B and C, were also melted, both being higher melting point glasses having softening points substantially higher than 700° C. and coefficients of thermal expansion on the order of $10 \times 10^{-7}$/°C. Glass B was a borosilicate glass composed of 67.2% $SiO_2$, 25.3% $B_2O_3$, 0.5% $K_2O$, 1.4% $Li_2O$ and 5.6%

CuO. This glass was melted for 4 hours at 1475° C. and drigaged. Glass C was composed of 45.3% SiO$_2$, 17.8% Al$_2$O$_3$ and 36.9% CuO. This glass was melted for four (4) hours at 1550° C. and the melt drigaged.

The three glasses, in granulated form, were then mixed in proportions of 100 parts Glass A, 40 parts Glass B and 25 parts Glass C. The mixture was ball milled to pass a 200 mesh screen (74 microns). This produced an intimate mixture of the three glasses which was then suspended in a 2.5% solution of nitrocellulose in amyl acetate in the ratio of 2.55 grams glass frit to 1 ml. of nitrocellulose solution.

Layers 42 and 44 of the suspended frit were laid down on the peripheral edges 30 and 32 of reflector 12 and lens 24 as described earlier. Layers 42 and 44 were air dried and lamp parts 12 and 24 were then assembled with the frit covered edges in opposed sealing relationship, as shown in FIG. 1. Reflector 12 and lens 24 were mounted in a suitable holder which maintained sealing layers 42 and 44 in contact and the parts in vertical alignment for the sealing operation.

The holder, with parts 12 and 24 assembled therein, was positioned on a carrier adapted to move the holder assembly horizontally through a sequence of steps separated by timed intervals during which the holder was raised into position for heat application. Initially, the assembled parts were elevated into an enclosed electric preheating oven operating at 700° C. and held there for four (4) minutes. At the end of this time, the glass assembly was heated to about 500° C., a temperature just below sealing temperature, and the organic material burned out. The preheated assembly was then lowered, moved under an array of focused infra-red lamps, and raised into sealing position within the lamp array.

FIG. 3 shows a top plan view of the infra-red lamp sealing arrangement with assembly 10 in position to be heated. Infra-red lamps 46 are of a tubular nature with parabolic reflectors 48, whereby their radiation is focused along a focal line parallel with the lamp. In accordance with the present invention, lamps 46 will be so positioned that the focal line will, as illustrated by dotted lines, occur at the interface of frit layer 42 and sealing surface 30. This is seen better in FIG. 4 which is essentially a cross-section of a fragment of FIG. 2 after the sealing occurs.

The infra-red heating arrangement comprised four tubular lamps 46 at an upper level in a rectangular arrangement and a second set in identical arrangement at a lower level. The two sets of lamps were so arranged that, when lamp assembly 10 was raised into position for heat application, the horizontal plane of its seal zone was intermediate the horizontal planes of the two lamp arrangements. The lamps are so spaced and positioned that their reflectors 48 direct focused infra-red radiation through lips 26 and 28 onto the frit-glass interface at angles of about 45° above and below the horizontal, respectively. This may be seen from FIG. 2 and is shown in greater detail in the schematic illustration of FIG. 4.

It may be noted that provision was made for internally flushing the assembly with argon during the preheat as a further precaution against damage to either the filament or the aluminum reflector. Also, supplemental heat was provided at the corners of the rectangular assembly during infra-red sealing. This is a practice utilized in flame sealing and is necessitated by the combined effect of glass mass in the corners and the greater tendency to cool in these remote zones.

Assembly 10 was exposed to lamps 46 for a period of 60 seconds, at which point a timer shut off the lamps. The assembly was then moved out of the lamp enclosure, transferred to a standard annealing kiln where the sealed assembly was annealed, and then cooled in normal manner to ambient.

A set of one hundred sealed beam lamps was produced by this procedure. These lamps were all found to be hermetically sealed. When placed on life test, they burned for 200–300 hours, the standard expected life for lamps of this type.

The simultaneous exposure of upper and lower surfaces 50,52 of the sealing layer to infra-red radiation has been found to be essential to forming a desirable seal. Attempts to expose one surface only, as suggested in prior disclosures, led to seals that had a high prevalence of leakers, that is, assemblies that would not hold a vacuum. Investigation revealed that uneven flow or spreading of the sealing mixture, poor melting of the sealing surface, and resultant weak seals occurred on the unexposed surface. When the radiation was prolonged sufficiently to cause good flow throughout the seal, there were tendencies to react or otherwise alter properties at the exposed interface.

Various alternative infra-red source arrangements could be used. Thus, the assembly may be moved past banks of lamps, rotated 90°, and then moved past further lamps. Alternatively, a circular lamp assembly may either be rotated past stationary lamps, or the lamps moved past a stationary assembly. In any event, the sealing glass may be at sealing temperature no longer than a minute or so.

The particular sealing mixture, employed in the pilot lamp sealing run described above, was selected on the basis of numerous glass composition and glass mixture studies. It represents the best combination found for the specific application described. It will be appreciated, however, that one would expect to make similar studies in selecting a mixture for a different sealing application.

In arriving at Glass A, numerous zinc silicoborates were melted to select a base glass of optimum physical characteristics for melting and sealing. This base glass was then melted with amounts of copper and/or iron oxides in amounts varying from one to twenty percent to determine both compatibility of the additive absorbing oxide and absorbing characteristics. Incidentally, it is the reduced form of copper and iron that provides optimum absorption. This then rules out use of the familiar lead borate and lead borosilicate type sealing glasses.

A wide variety of higher melting point glasses was checked to determine both compatibility and effect on expansion coefficient. In addition to Glasses B and C above, the following are alternatives:

|  | D | E |
| --- | --- | --- |
| SiO$_2$ | 51.4 | — |
| B$_2$O$_3$ | — | 67.7 |
| Al$_2$O$_3$ | 34.9 | 6.2 |
| MgO | 13.7 | — |
| CuO | — | 26.1 |

Glass D was melted at 1600° C. for 16 hours in a platinum container, while glass E was melted for four hours at 1550° C. The softening points of these glasses are substantially above 700° C., but could not be determined accurately because of crystallization tendencies.

These glasses were granulated and ball milled to pass a 200 mesh screen. They were then mixed in sequentially increasing amounts with the selected soft glass A and sealing tests conducted. The ranges covered by the glass mixtures prepared for these sealing tests were:

100 parts A+1-40 parts D
100 parts A+1-40 parts D+1-50 parts B
100 parts A+1+30 parts C+1-40 parts B From the sealing tests thus performed, the mixture described earlier was selected for the lamp sealing program.

FIG. 5 of the drawing illustrates the thermal expansion characteristics which determine compatibility of sealing materials with glass components to be sealed, and how such expansion characteristics can be modified in accordance with one facet of the present invention. In this Figure, temperature in degrees Centigrade (°C.) is plotted along the horizontal axis of the graph, while linear expansion ($\Delta L/L$) is plotted in parts per million (ppm) along the vertical axis.

Curve A represents a plot of measured values for base glass A described above; Curve B represents a similar plot of measured expansion values for Code No. 7251, the lamp component glass; Curve C is a corresponding set of values for a mixture composed of 100 parts Glass A and 20 parts of Glass D, the latter having a coefficient of thermal expansion of about $4 \times 10^{-7}/°C$. It will be observed that the Glass D addition effectively changes the expansion of Glass A from a value greater than the Code No. 7251 glass to a value somewhat less, whereby a seal in tension changes to one in compression. The magnitude of change may be seen by comparing the coefficient of thermal expansion over the 25°-300° C. range for the three materials under consideration:

| Glass | Coefficient $\times 10^{-7}$ |
| --- | --- |
| 7251 | 37.8 |
| A | 41.2 |
| A + D | 34.9 |

We claim:

1. A sealed beam lamp comprising a filament mounted in a fixed relationship in a reflector member, the reflector member being hermetically sealed to a glass lens member by a layer of sealing material intermediate opposed sealing surfaces on the lens and reflector members, the lens and reflector members being molded from a borosilicate glass having a coefficient of thermal expansion in the range of 30 to $40 \times 10^{-7}/°C.$, and the layer of sealing material being a fused mixture having an effective coefficient of thermal expansion not greater than that of the borosilicate glass, the mixture being composed of a sealing glass and a mill addition, the sealing glass having a softening point below 700° C., a coefficient of thermal expansion greater than that of the borosilicate glass parts, and containing, as part of its composition, an infra-red absorbing oxide selected from copper oxide, iron oxide, and mixtures thereof, and the mill addition, as compared to the sealing glass, having a substantially higher softening point and a lower coefficient of thermal expansion, said sealing glass being a zinc silicoborate composed essentially of 60–70% ZnO, 10–16% $SiO_2$, and 19–25% $B_2O_3$ plus the infra-red absorbing oxide, and said mill addition being a glass having the approximate composition of the mineral cordierite.

2. A composite article in accordance with claim 1 wherein the infra-red absorbing oxide is copper oxide in an amount up to about 20%.

* * * * *